(12) United States Patent
Chen et al.

(10) Patent No.: US 11,207,760 B2
(45) Date of Patent: Dec. 28, 2021

(54) THERMAL TREATMENT AND SHOT PEENING METHOD FOR WHEEL

(71) Applicant: CITIC Dicastal CO., LTD., Hebei (CN)

(72) Inventors: Tieqiang Chen, Qinhuangdao (CN); Chunhai Liu, Qinhuangdao (CN); Zuo Xu, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 142 days.

(21) Appl. No.: 16/693,880

(22) Filed: Nov. 25, 2019

(65) Prior Publication Data
US 2020/0298372 A1    Sep. 24, 2020

(30) Foreign Application Priority Data

Mar. 22, 2019    (CN) .......................... 201910220741.3

(51) Int. Cl.
*B24C 1/10* (2006.01)
*B60B 1/00* (2006.01)

(52) U.S. Cl.
CPC ................ *B24C 1/10* (2013.01); *B60B 1/006* (2013.01); *B60B 2310/542* (2013.01); *B60B 2310/622* (2013.01)

(58) Field of Classification Search
CPC ..... B24C 1/10; B60B 1/006; B60B 2310/622; B60B 2310/542; B60B 2310/208; B60B 2360/104; B60B 3/00
See application file for complete search history.

(56) References Cited

U.S. PATENT DOCUMENTS

| 4,228,671 | A | * | 10/1980 | Skeen | ........................ | B24C 1/10 |
| | | | | | | 29/894.325 |
| 5,722,165 | A | * | 3/1998 | Kobayashi | ............... | B21K 1/28 |
| | | | | | | 29/894.32 |
| 2012/0055590 | A1 | * | 3/2012 | Kamat | .................... | C22C 21/16 |
| | | | | | | 148/551 |
| 2020/0277691 | A1 | * | 9/2020 | Lin | ........................ | C22C 21/14 |

FOREIGN PATENT DOCUMENTS

| CN | 106103765 A | 11/2016 | |
| EP | 3124633 A1 * | 2/2017 | .............. C22F 1/047 |
| PL | 225918 | 6/2017 | |

\* cited by examiner

*Primary Examiner* — Ryan J. Walters
(74) *Attorney, Agent, or Firm* — Cooper Legal Group, LLC

(57) ABSTRACT

A thermal treatment and shot peening method for a wheel, including: heating a wheel blank to T1, and preserving the heat for t1; fast heating the wheel blank to T2, and preserving the heat for t2; performing quenching treatment, wherein a quenching medium is at temperature of T3, and the quenching transfer time is t3; performing aging treatment at aging temperature of T4, and preserving the heat for t4; performing first-stage shot peening; and performing second-stage shot peening.

8 Claims, 5 Drawing Sheets

THERMAL TREATMENT AND SHOT PEENING METHOD FOR WHEEL

CROSS-REFERENCE TO RELATED APPLICATIONS

The present application claims benefit of Chinese Application No. 201910220741.3, filed on Mar. 22, 2019, the contents of which are hereby incorporated by reference in their entirety.

BACKGROUND

According to the website of China Association of Automobile Manufacturers (CAAM), both the production volume and the sales volume of automobiles in China exceeded 28 million in 2016, and ranked the first in the world for eight consecutive years. With the rapid increase of the car ownership, the problem of tight energy supply and increased exhaust pollution has become increasingly prominent. Energy saving, emission reduction and low-carbon environmental protection have become the development direction and a new historical mission for automakers nowadays. In recent years, people have done a lot of researches on energy saving and emission reduction of automobiles, and many measures have been taken. One of the most effective measures is lightweight of automobiles. According to the relevant researches, 60% of fuel used in an automobile is consumed by the weight of the automobile. For every 100 kg of weight loss of the automobile, the fuel consumption per 100 kilometers can be reduced by about 0.7 L. For every 1 L of fuel saved, $CO_2$ emission can be reduced by 2.28 Kg, and the annual emission can be reduced by 30% or above. In addition, for every 1% of weight loss of a general part of the automobile, 1% of fuel can be saved. For every 1% of weight loss of a moving part, 2% of fuel can be saved. With the increasing demand for lightweight automobiles, aluminum alloy wheels are being widely popularized and used in the automotive industry thanks to their advantages such as light weight and good shock absorption performance.

Compared with a cast aluminum alloy wheel, a forged aluminum alloy wheel has finer internal grains, high material strength and elongation and higher strength-to-weight ratio, and is much higher in impact resistance, shear strength and tensile load than the cast aluminum alloy wheel. According to statistics, the forged aluminum alloy wheel may be lighter than the cast aluminum alloy wheel by 15 to 25%. Thermal treatment is one of the most important processes in the production of the forged aluminum alloy wheels, and is of vital importance to the performance, quality and service life of the wheels. A suitable thermal treatment process may fully exert the use potential of a material, reduce stress concentration and eliminate internal stress. In addition, long-term service of the forged aluminum alloy wheels in complex environments and working conditions is prone to micro fatigue cracks on the surfaces of the wheels and exacerbated extension, resulting in an ultimate failure of the wheels.

There is still a lot of room for improvement on the demand of the forged aluminum alloy wheel market for technologies and on actual products.

SUMMARY

The present disclosure relates to the technical field of wheels, and particularly relates to a thermal treatment and shot peening method for a wheel.

In view of this, the present disclosure aims to provide a thermal treatment and shot peening method for a wheel, which may minimize the residual stress generated in the prior art, improve the fatigue performance, enhance the strength of the wheel and prolong the service life.

In order to achieve the above objective, the technical solution of the present disclosure is realized as follows.

A thermal treatment and shot peening method for a wheel includes the following steps:

S1, heating a wheel blank to T1, and preserving the heat for t1, so as to effectively remove internal residual stress of the wheel accumulated in a deformation process and release deformation storage energy;

S2, fast heating the wheel treated in S1 to T2, and preserving the heat for t2, so as to allow a solute playing a role of strengthening in an alloy to be dissolved into an aluminum solid solution to the maximum extent to form a uniform solid solution;

S3, quenching the wheel treated in S2, in which a quenching medium is at temperature T3, and the quenching transfer time is t3, so that a supersaturated solid solution is formed at normal temperature, and precipitation of an excess phase may also be prevented;

S4, performing aging treatment on the wheel treated in S3 at aging temperature of T4, and preserving the heat for t4, in which a strengthening phase is separated out in a dispersed manner from the solid solution through the aging, thus obtaining a required performance requirement;

S5, performing first-stage shot peening on the wheel treated in S4 under the following conditions: a shot diameter is d1, a nozzle distance is D1, an impact angle is A1, a shot flow is F1 and a shot speed is V1, thereby generating relatively high residual compressive stress on the surface of the wheel;

S6, performing second-stage shot peening on the wheel treated in S5 under the following conditions: a shot diameter is d2, a nozzle distance is D2, an impact angle is A2, a shot flow is F2 and a shot speed is V2, which may further increase the surface coverage rate of shot peening and effectively improve the surface state of the wheel.

Further, the shot diameter d1 is greater than the shot diameter d2. Through the treatment by two different shot diameters, the relatively high residual compressive stress may be obtained, and relatively high surface quality may also be achieved.

Further, the T1 is 350 to 450 DEG C., and the t1 is 150 to 300 min. The T2 is 470 to 550 DEG C., and the t2 is 100 to 200 min. The T3 is 50 to 80 DEG C., and the t3 is 10 to 20 min.

Further, the d1 is 0.7 to 0.9 mm; the D1 is 155 to 165 mm; the A1 is 30 to 90 degrees; the F1 is 6.5 to 8.2 kg/min; and the V1 is 110 to 150 m/s. The d2 is 0.2 to 0.5 mm; the D2 is 145 to 165 mm; the A2 is 30 to 90 degrees; the F2 is 3.5 to 5.5 kg/min; and the V2 is 100 to 120 m/s.

Further, the shot is a cast steel shot. The obtained residual compressive stress and surface quality of the wheel are higher than the residual compressive stress and surface quality obtained on the basis of other types of shots.

Further, the quenching medium is water or a water-based organic polymer.

Compared with the prior art, the thermal treatment and shot peening method for the wheel has the following advantages that:

the thermal treatment and shot peening method for the wheel may minimize the residual stress generated by the prior art, enhance the strength of the wheel and prolong the service life.

BRIEF DESCRIPTION OF DRAWINGS

The drawings constituting one part of the present disclosure are used to provide a further understanding of the present disclosure. Illustrative embodiments and descriptions thereof of the present disclosure are used to explain the present disclosure, and do not constitute an improper limitation to the present disclosure. In the drawings.

DETAILED DESCRIPTION

It should be noted that the embodiments in the present disclosure and features in the embodiments may be combined with each other without conflicts.

Technical solutions of the present disclosure will be described clearly and completely below in combination with the drawings and the embodiments. Obviously, the embodiments described herein are only part of the embodiments of the present disclosure, not all the embodiments. Based on the embodiments in the present disclosure, all other embodiments obtained by those ordinarily skilled in the art without doing creative work shall fall within the protection scope of the present disclosure.

Two technical measures, namely thermal treatment and shot peening, of the embodiment are closely combined, and both of them are indispensable.

The wheel of the embodiment refers to a wheel for a pneumatic tire, a rim and a spoke of which may be integrated, permanently connected or detachable, and wheels used in passenger vehicles, commercial vehicles and special-purpose vehicles are definitely included (but not limited to).

The wheel of the embodiment before thermal treatment is in a workpiece state of a forged or machined blank or semifinished product.

The wheel of the embodiment is an aluminum alloy wheel, including series products in sizes of (but not limited to) 16 inches, 17 inches, 17.5 inches, 19.5 inches and 22.5 inches, and is produced by a forging or forging spinning process.

Figure 1:
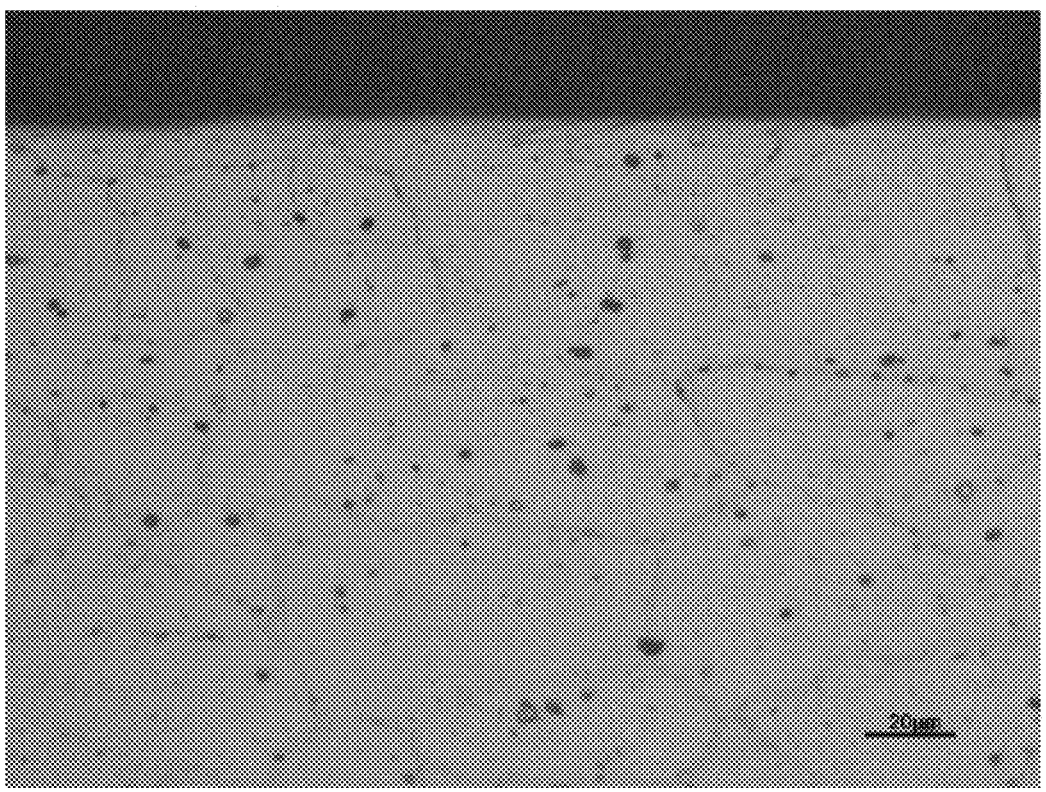
FIG. 1 is a surface microstructure of a wheel according to a first method embodiment of the present disclosure after thermal treatment.
Figure 2:
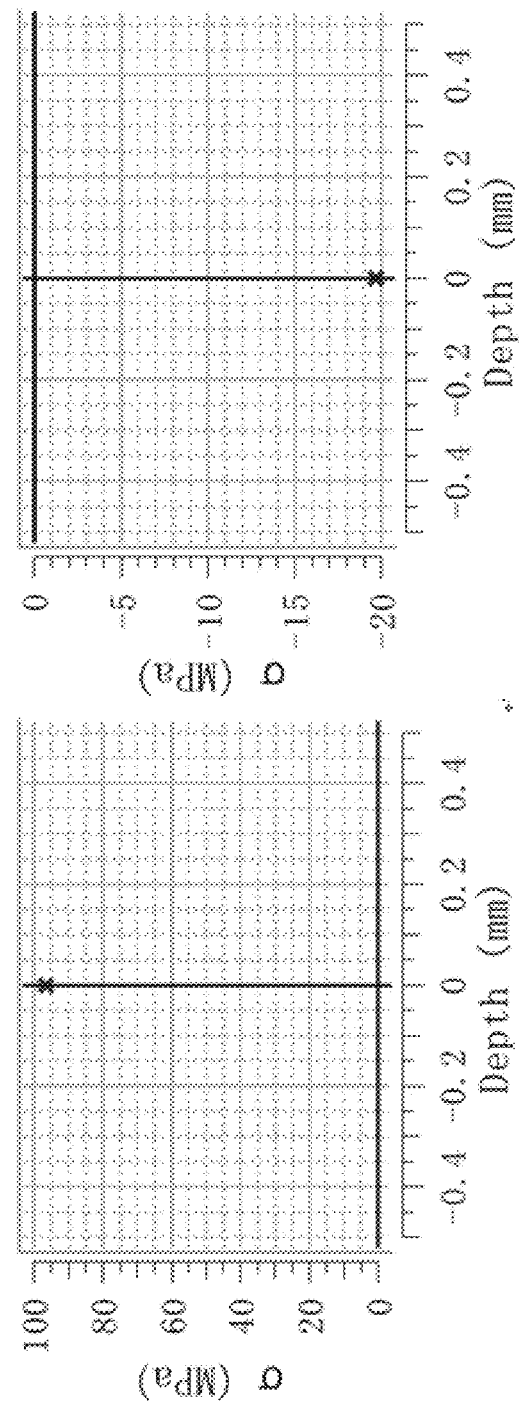
FIG. 2 illustrates surface residual stresses of the wheel according to the first method embodiment of the present disclosure before and after the thermal treatment.
Figure 3:
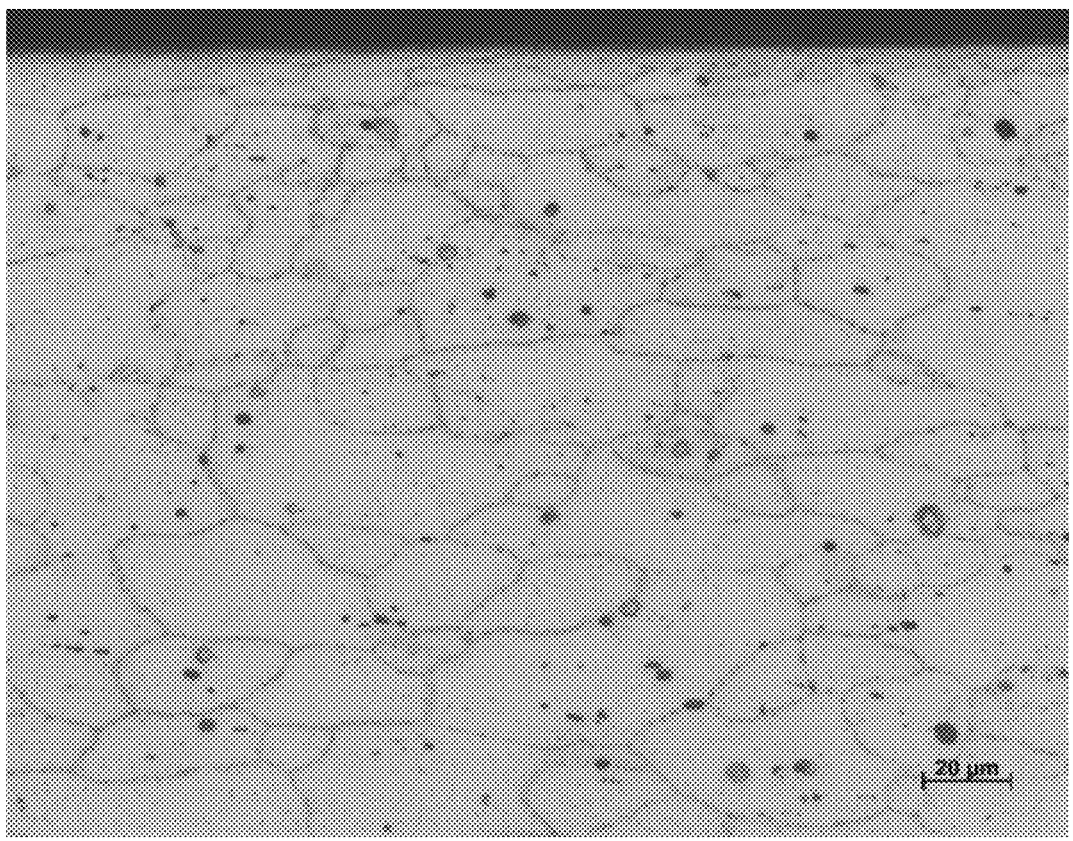
FIG. 3 is a surface microstructure of the wheel according to the first method embodiment of the present disclosure after the thermal treatment and surface shot peening.
Figure 4:
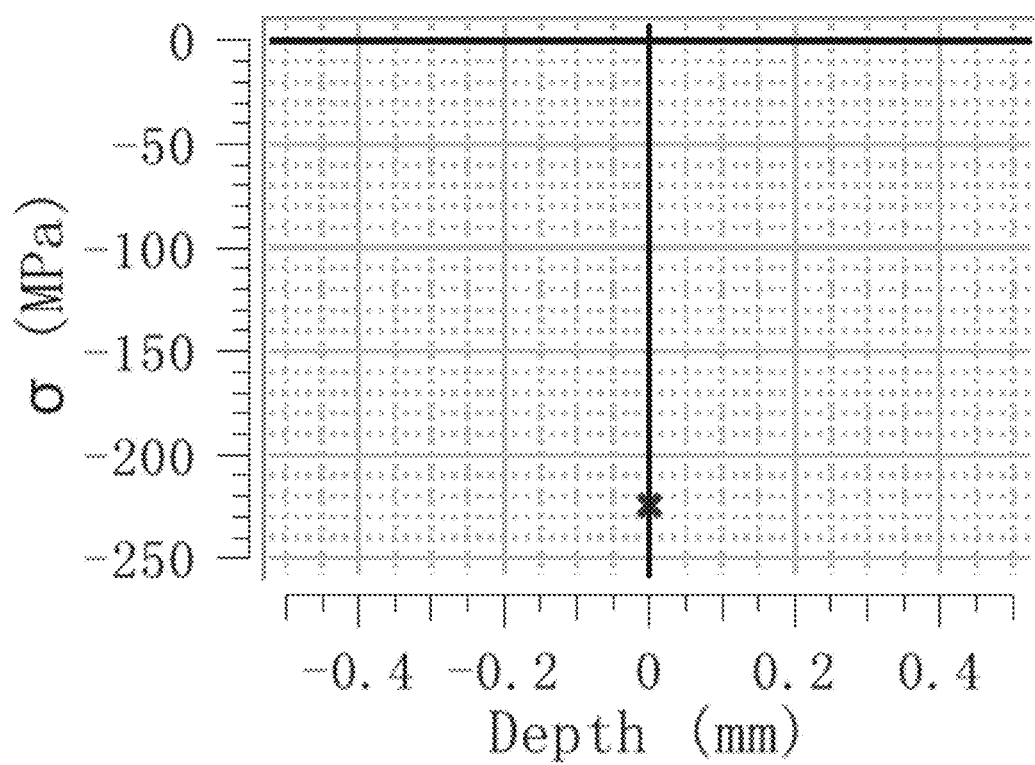
FIG. 4 illustrates surface residual stresses of the wheel according to the first method embodiment of the present disclosure after the thermal treatment and the surface shot peening.
Figure 5:
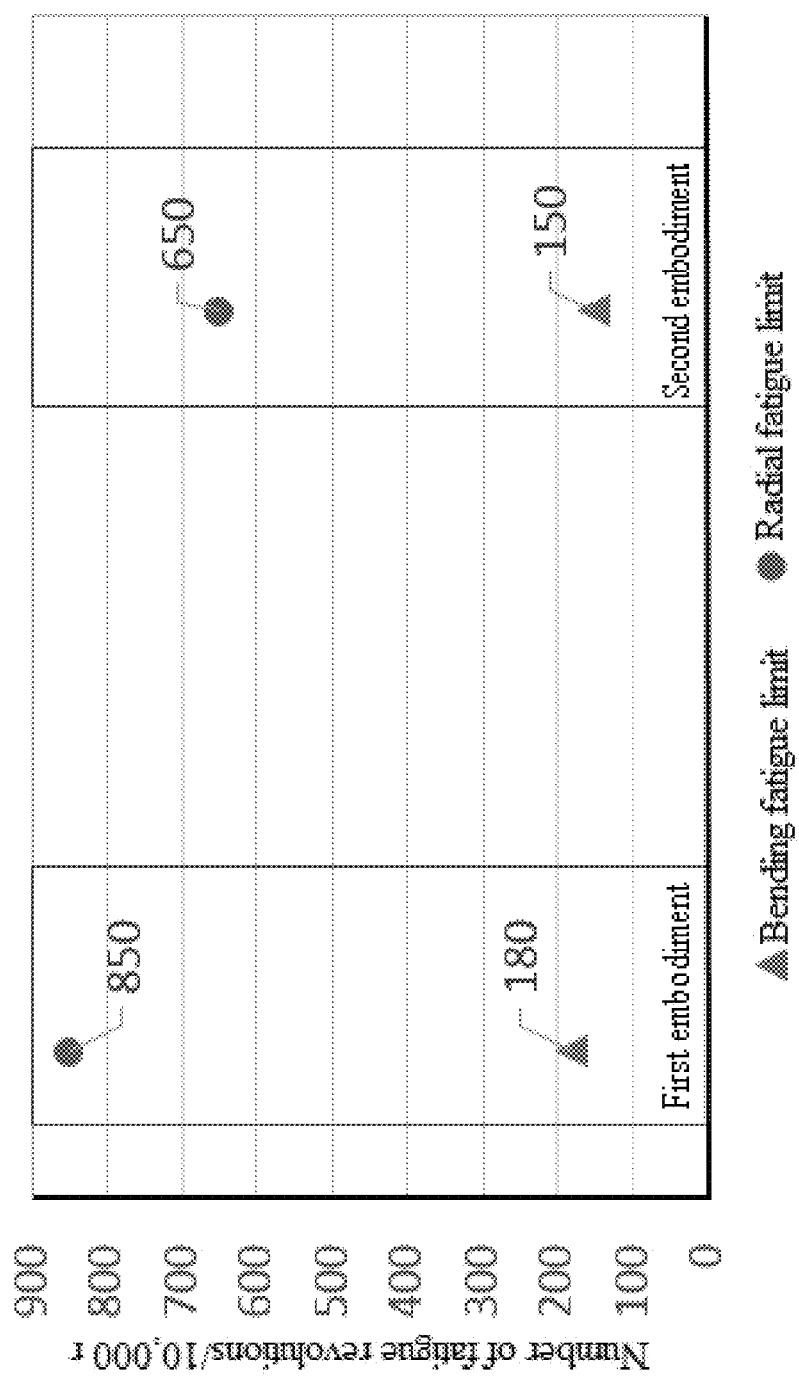
FIG. 5 illustrates experimental results of bending fatigue limits and radial fatigue limits of wheels according to first and second method embodiments of the present disclosure after the thermal treatment and the surface shot peening.

A thermal treatment and shot peening method for a wheel of an embodiment of the present disclosure is described below with reference to FIG. 1 to FIG. 5 and in combination with the embodiment.

First Embodiment

According to a thermal treatment and shot peening method for a wheel of the present disclosure, a 6061 or 6082 aluminum alloy is used as a material, and is made into a wheel blank through forging or forging spinning. The wheel blank has a size of 22.5 inches×9 inches without machining or after being machined. The wheel blank is heated to 380 to 420 DEG C., and the heat is preserved for 200 to 250 min. Then, the wheel blank is rapidly heated to 500 to 550 DEG C. with a furnace, and the heat is preserved for 150 to 180 min, and solution treatment is performed. The wheel subjected to the solution treatment is placed in a quenching medium for quenching treatment, and the quenching medium is water or a water-based organic polymer and at temperature of 75 DEG C., and the quenching transfer time is within 12 s. Finally, artificial aging is performed at temperature of 160 to 180 DEG C., and the heat is preserved for 300 to 400 min.

Surface shot peening treatment is performed on the wheel subjected to the thermal treatment by a compressed air shot peening machine. First-stage shot peening is performed at first. A shot for peening is a cast steel shot S230 having a diameter of 0.72 mm. A nozzle distance is 155 mm; an impact angle is 30 degrees or 45 degrees; a shot flow is 6.55 kg/min; a shot speed is 110 to 130 m/s; the surface coverage rate of the wheel is 90 percent or above. After the first-stage shot peening is completed, second-stage shot peening is performed. A shot used is a cast steel shot S110 having a diameter of 0.34 mm. A nozzle distance is 155 mm; an impact angle is 30 degrees or 45 degrees; a shot flow is 4.55 kg/min; a shot speed is 100 to 110 m/s; the surface coverage rate of the wheel is 95 percent or above. In order to achieve higher surface quality, surface precision polishing treatment may be finally performed according to a requirement of a client.

Second Embodiment

According to a thermal treatment and shot peening method for a wheel of the present disclosure, a 7075 or 7A04 aluminum alloy is used as a material, and is made into a wheel blank through forging or forging spinning. The wheel blank has a size of 22.5 inches×14 inches without machining or after being machined. The wheel blank is heated to 350 to 400 DEG C., and the heat is preserved for 200 to 300 min. Then, the wheel blank is rapidly heated to 470 to 490 DEG C. with a furnace, and the heat is preserved for 100 to 150 min, and solution treatment is performed. The wheel subjected to the solution treatment is placed in a quenching medium for quenching treatment, and the quenching medium is water or a water-based organic polymer and at temperature of 50 DEG C., and the quenching transfer time is within 20 s. Finally, artificial aging is performed at temperature of 120 to 150 DEG C., and the heat is preserved for 600 to 800 min.

Surface shot peening treatment is performed on the wheel subjected to the thermal treatment by a compressed air shot peening machine. First-stage shot peening is performed at first. A shot for peening is a cast steel shot S330 having a diameter of 0.84 mm. A nozzle distance is 165 mm; an impact angle is 45 degrees or 90 degrees; a shot flow is 8.2 kg/min; a shot speed is 130 to 150 m/s; the surface coverage rate of the wheel is 95 percent or above. After the first-stage shot peening is completed, second-stage shot peening is performed. A shot used is a cast steel shot S110 having a diameter of 0.34 mm. A nozzle distance is 155 mm; an impact angle is 45 degrees or 90 degrees; a shot flow is 4.55 kg/min; a shot speed is 110 to 120 m/s; the surface coverage rate of the wheel is 95 percent or above. In order to achieve higher surface quality, surface precision polishing treatment may be finally performed according to a requirement of a client.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

The invention claimed is:

1. A thermal treatment and shot peening method for a wheel, comprising the following steps:
   S1, heating a wheel blank to T1, and preserving the heat for t1;
   S2, fast heating treated in S1 to T2, and preserving the heat for t2;
   S3, quenching treated in S2, wherein a quenching medium is at temperature T3, and the quenching transfer time is t3;
   S4, performing aging treatment on treated in S3 at aging temperature of T4, and preserving the heat for t4;
   S5, performing first-stage shot peening on treated in S4 under the following conditions: a shot diameter is d1, a nozzle distance is D1, an impact angle is A1, a shot flow is F1 and a shot speed is V1; and
   S6, performing second-stage shot peening on treated in S5 under the following conditions: a shot diameter is d2, a nozzle distance is D2, an impact angle is A2, a shot flow is F2 and a shot speed is V2.

2. The thermal treatment and shot peening method for a wheel according to claim 1, wherein the T1 is 350 to 450 DEG C., and the t1 is 150 to 300 min; the T2 is 470 to 550 DEG C., and the t2 is 100 to 200 min; and the T3 is 50 to 80 DEG C., and the t3 is 10 to 20 min.

3. The thermal treatment and shot peening method for a wheel according to claim 1, wherein the shot diameter d1 is greater than the shot diameter d2.

4. The thermal treatment and shot peening method for a wheel according to claim 3, wherein the T1 is 350 to 450 DEG C., and the t1 is 150 to 300 min; the T2 is 470 to 550 DEG C., and the t2 is 100 to 200 min; and the T3 is 50 to 80 DEG C., and the t3 is 10 to 20 min.

5. The thermal treatment and shot peening method for a wheel according to claim 4, wherein the d1 is 0.7 to 0.9 mm; the D1 is 155 to 165 mm; the A1 is 30 to 90 degrees; the F1 is 6.5 to 8.2 kg/min; the V1 is 110 to 150 m/s; the d2 is 0.2 to 0.5 mm; the D2 is 145 to 165 mm; the A2 is 30 to 90 degrees; the F2 is 3.5 to 5.5 kg/min; and the V2 is 100 to 120 m/s.

6. The thermal treatment and shot peening method for a wheel according to claim 5, wherein the shot used for shot peening is a cast steel shot.

7. The thermal treatment and shot peening method for a wheel according to claim 3, wherein the quenching medium is water or a water-based organic polymer.

8. The thermal treatment and shot peening method for a wheel according to claim 1, wherein the quenching medium is water or a water-based organic polymer.

* * * * *